United States Patent
Harvey

[15] 3,680,453
[45] Aug. 1, 1972

[54] PHOTOGRAPHIC APPARATUS
[72] Inventor: Donald M. Harvey, Webster, N.Y.
[73] Assignee: Eastman Kodak Company, Rochester, N.Y.
[22] Filed: March 30, 1970
[21] Appl. No.: 23,642

[52] U.S. Cl..............................95/10 CT, 95/11.5 R
[51] Int. Cl.........................G03b 7/08, G03b 15/035
[58] Field of Search........................95/10 CE, 10 CT

[56] References Cited

UNITED STATES PATENTS

| | | | |
|---|---|---|---|
| 3,245,332 | 4/1966 | Kagan | 95/10 X |
| 3,422,738 | 1/1969 | Mori et al. | 95/10 |
| 3,433,138 | 3/1969 | Burgarella | 95/10 |
| 3,509,806 | 5/1970 | Kiper | 95/10 |
| 3,522,763 | 8/1970 | Dietz | 95/10 |

Primary Examiner—Samuel S. Matthews
Assistant Examiner—Michael L. Gellner
Attorney—Robert W. Hampton and Leonard W. Treash, Jr.

[57] ABSTRACT

A camera having automatic exposure control circuitry and apparatus operative in a first condition to provide an exposure interval solely based upon the amount of ambient light reaching a photoresponsive element and a second condition to provide an exposure interval based upon a fixed time interval or upon the amount of light reaching the same photoresponsive element, whichever is the lesser interval.

4 Claims, 8 Drawing Figures

DONALD M. HARVEY
INVENTOR.

DONALD M. HARVEY
INVENTOR.

BY *Leonard W. Treash,*
*R W Hampton*
ATTORNEYS

PHOTOGRAPHIC APPARATUS

CROSS-REFERENCE TO RELATED APPLICATION

Reference is made to commonly assigned, copending U.S. Pat. Application Ser. No. 99,184, entitled CAMERA MECHANISM, filed Dec. 17, 1970 in the name of Francis A. Williams

BACKGROUND OF THE INVENTION

1. Field of the Invention

This invention relates to cameras. More specifically, this invention relates to cameras employing what is commonly known as an electronic shutter.

2. Description of the Prior Art

The term "electronic shutter" has been applied to exposure control systems for cameras in which an electronic timing circuit responsive to scene light is actuated synchronously with the opening of the camera shutter. The timing circuit triggers closing of the shutter after a time has elapsed which is functionally related to scene light conditions. This mechanism has the advantage of high accuracy for both low and high conditions of scene illumination.

Because common photoresistive elements used in the timing circuit do not respond immediately to changes in illumination, an adjustment in the electronic circuit is desired when a flash device is used with an electronic shutter. Commonly, a mechanism is provided for applying a constant shutter speed to the system when operated with flash. This can be done automatically in response to insertion of the flash device in the system, for example, in response to positioning an electronic flash in an external shoe, plugging in a flash cable or by inserting a flashcube in a camber flashcube socket. Among known structures for providing a constant shutter speed are those altering the characteristics of the timing circuit upon insertion of a flash device by switching the photoresistive element out of the circuit and switchinG a constant resistance in or by putting another resistance in parallel with the photoresistive element to lessen its effect on the timing circuit. Similarly, the electronic shutter can be switched off completely and a mechanical shutter used for flash.

It is sometimes desirable to use flash in conditions of high scene light to fill in shadow areas in the subject. The above-mentioned flash devices have the common disadvantage in such an application of substantially altering the exposure time in response to flash insertion regardless of the amount of scene light present.

SUMMARY OF THE INVENTION

According to the invention, insertion of a flash device in an electronic shutter exposure control apparatus does not vary the timing circuit under high scene light conditions but provides a maximum exposure time effective in intermediate and low light conditions. This permits scene light to control the fill-in flash condition as though daylight alone was present, but provides a proper flash exposure time useful when the flash itself is necessary to provide enough scene illumination for picture taking.

According to a preferred embodiment of the invention, insertion of a flash device in a camera system adds to a conventional electronic shutter a mechanically timed switch which will close the electronic shutter after a predetermined time if the electronic circuit has not already closed it in response to scene illumination.

It is another feature of the invention that the electronic shutter used in combination with the switching device described above is one which opens electrically in response to energization of the electromagnet. This system is particularly useful with a mechanically timed switching device because it allows the timing function to operate off the single opening and closing of a main power switch for the shutter circuit.

It is a feature of the invention that the mechanically timed switching device is operated off a single driving member which also actuates a percussion flash device.

It is another feature of the invention to provide a single element which actuates an electronic shutter and fires a percussive flash device and which can be cocked in response to film advance in a camera adapted for in-camera processing of film. It is a more specific feature of this portion of the invention that a highly advantageous cocking mechanism is provided which not only positions the driving member for actuation of the electronic shutter and percussive element but rotates a flashcube socket holding a percussive flashcube.

It is another feature of the invention to provide a double exposure prevention device operating off the same driving element described above.

It is another feature of this invention to use a shutter mechanism which is opened and closed electrically in a camera adapted for in-camera processing of film. This combination is particularly advantageous since the structure of such camera is made simpler if no mechanical coupling from the flash and body release portion of the camera to the shutter portion is necessary.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because certain parts of photographic and related apparatus are well known, the following description is directed in particular to those elements forming, or cooperating directly with, the present invention, elements that are not specifically shown or described herein being understood to be selectable from those known in the art.

Figure 2:
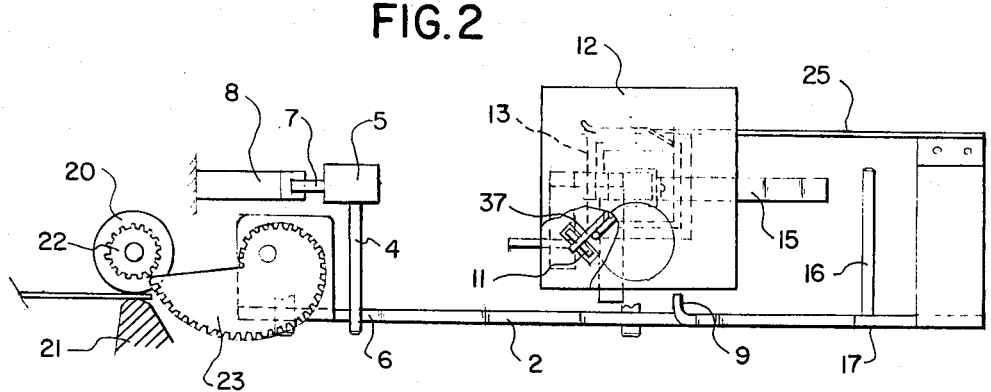
FIG. 2 is a top view of the camera in the condition shown in FIG. 1.
Figure 1:
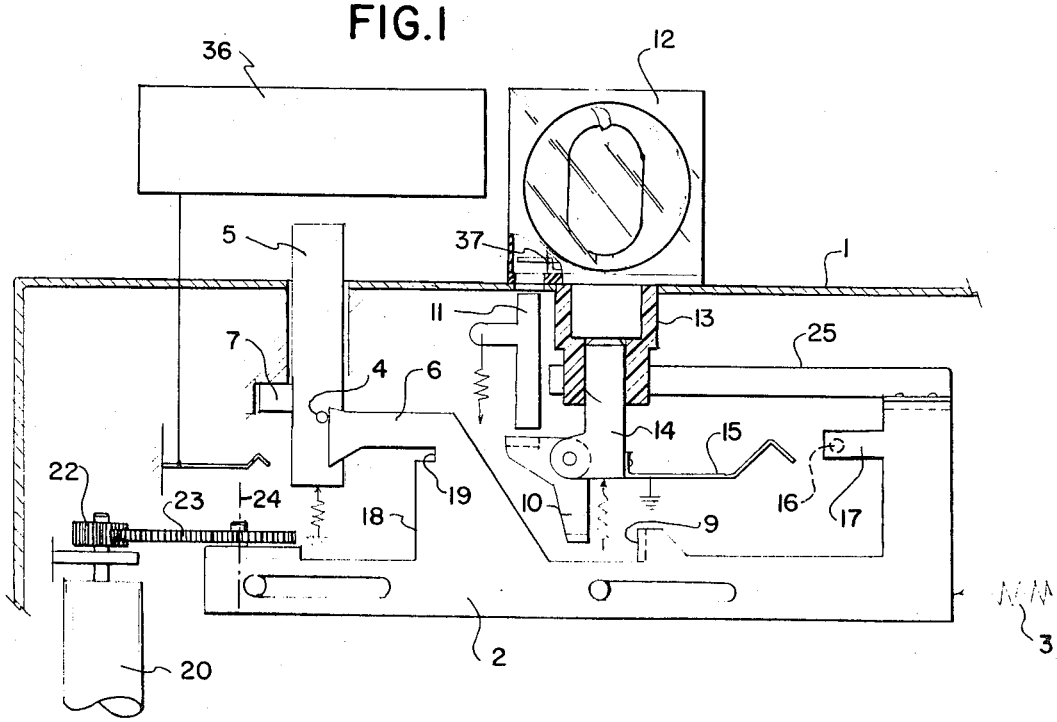
FIG. 1 is a front view of a camera constructed according to the invention with its operative elements cocked for picture-taking operation using a flash.

Referring to FIGS. 1 and 2, a camera 1 includes a shutter-flash synchronizing mechanism for operation with an electronic shutter and a percussion actuated flashcube. Synchronization is controlled by a reciprocating member 2 which is shown in FIG. 1 in cocked position urged by a spring 3 toward the left. The reciprocating member 2 is held in its cocked position by a pin 4 on a body release 5 which pin engages an arm 6 on the reciprocating member 2.

Upon depression of the body release 5 a lug 7 closes a switch 8 which when closed together with a switch 15 facilitate the energization of an electronic shutter circuit 36 more fully described below with reference to FIG. 8. Further depression of the body release 5 causes pin 4 to move past arm 6 on reciprocating member 2 thereby releasing reciprocating member 2 to move to the left under urging of spring 3.

The camera 1 includes in its upper casing a flashcube socket 13 for receiving a percussive flashcube 12. The flashcube includes four percussively actuable flashlamps, each lamp having an individual spring-energized striker 37 releasable by upward movement from below to fire its respective lamp. Insertion of flashlamp 12 in the socket 13 pushes a cube sensing plunger 14 in a downward direction. This moves a bell crank 10 to a position in the path of a lug 9 on reciprocating member 2. As reciprocating member 2 moves to the left, lug 9 strikes the bell crank 10 which in turn strikes a flash actuating member 11 which passes through an opening in the base of the flashcube 12 to release the striker 37 thereby firing the lamp.

Also moving in response to lowering of cube sensing plunger 14 is a timing circuit switch 15 which moves into the position shown in FIG. 1 for flash operation. The shutter which is more fully described below is opened in response to energization of the circuit and can be closed in response to de-energization of the circuit. When the switch 15 is in the position shown in FIG. 1 a contact pin 16 on an arm 17 on reciprocating member 2 contacts switch 15 for a constant period of time as the reciprocating member 2 moves to the left, thereby closing the shutter circuit 36 to ground through already closed switch 8. As the reciprocating member 2 moves further to the left, the pin 16 leaves the switch 15 opening the circuit and causing the shutter to close. The length of this contact is chosen to cause the shutter to be opened the desired length of time for ordinary flash operation, for example, 1/30 of a second. As will be described below with regard to description of the shutter and its circuit, if there is enough scene light present to give a faster exposure time as in fill-in flash operation, such faster time will have closed the shutter before pin 16 leaves switch 15.

Figure 3:
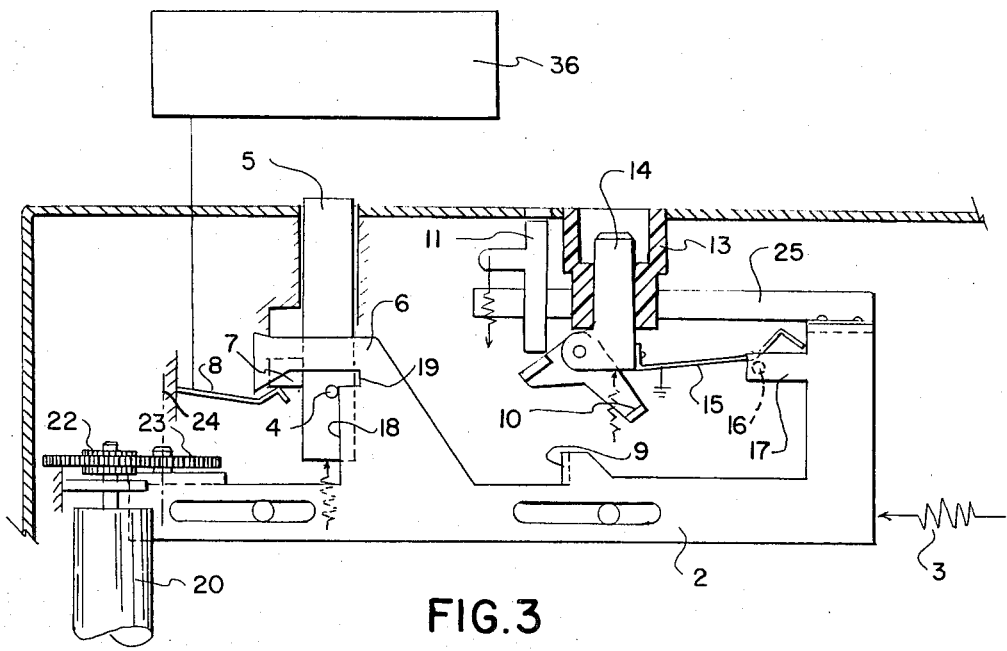
FIG. 3 is a front view of the camera shown in FIG. 1 shortly after picture-taking operation without flash.

FIG. 3 shows the same mechanism when no cube has been received in the flashcube socket 13. With no cube in socket 13 cube sensing plunger 14 is spring urged into a raised position which brings bell crank 10 out of the path of lug 9 on the reciprocating member 2 thereby disabling the flash firing mechanism. With the cube sensing plunger 14 in its raised condition, switch 15 is also raised so that contact pin 16 contacts the opposite side from that contacted in flash operation and remains closed as the reciprocating member 2 moves further to the left. This permits the scene light controlled timing circuit to continue to function beyond the desired time period for flash operation.

Double exposure prevention is accomplished by the configuration of arm 6 on reciprocating member 2. Referring to FIG. 3, reciprocating member 2 moves to the left until pin 4 on the body release 5 engages a stop shoulder 18 on the reciprocating member. As the body release 5 is released by the operator, it is free to travel only up to a lower surface 6a of shoulder 6 at which point the reciprocating member 2 moves a further distance to the left until the pin 4 is lodged in a recess 19. This small amount of upward movement of the body release 5 releases switch 8 from engagement with lug 7. At the same time the recess 19 prevents movement of the body release in either direction thereby preventing another exposure until the camera has been cocked by means more fully described below.

Figure 4:
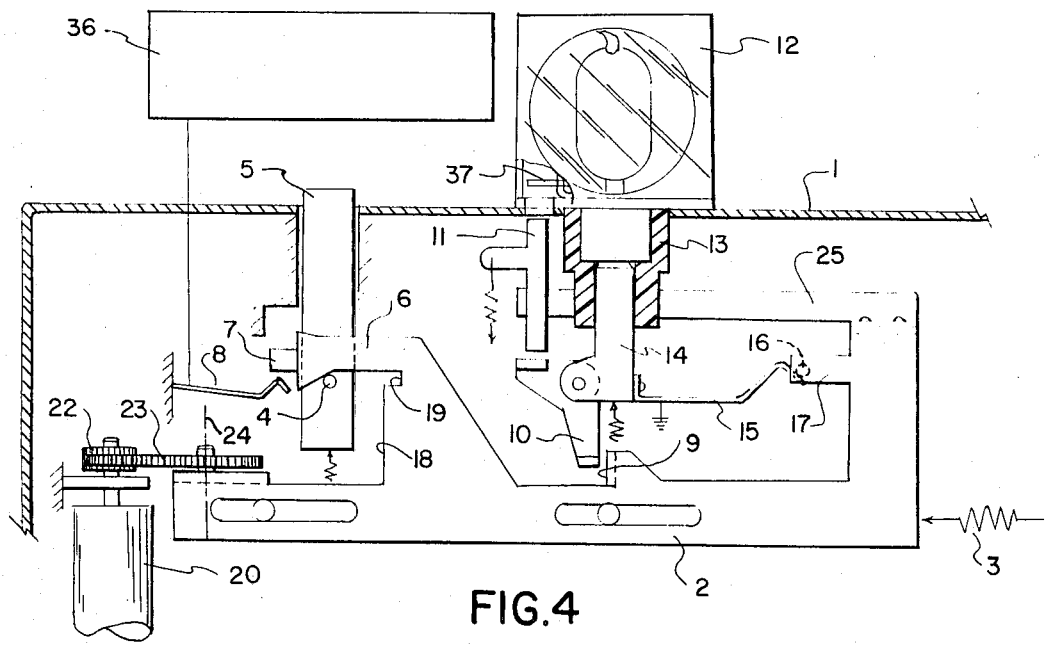
FIG. 4 is a front view of the camera shown in FIG. 1 during its cocking cycle.
Figure 5:
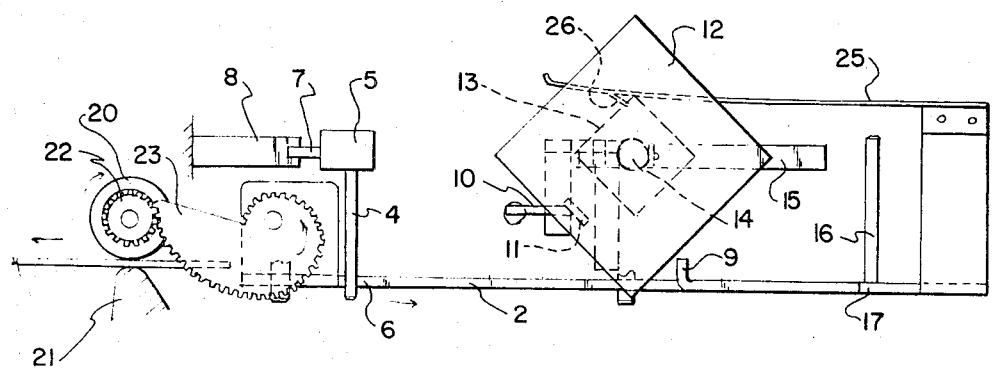
FIG. 5 is a top view of the camera shown in FIG. 4 during its cocking cycle.

Referring to FIGS. 4 and 5, a mechanism is shown for cocking reciprocating member 2 in response to positioning of unexposed film in the exposure aperture of the camera. This mechanism per se is the subject matter of a separate invention made by another and disclosed to me prior to my invention of the apparatus herein claimed, said mechanism being disclosed and claimed in commonly assigned, copending U.S. Pat. Application Ser. No. 99,184, entitled CAMERA MECHANISM and filed Dec. 17, 1970 in the name of Francis A. Williams. As shown in FIGS. 4 and 5, camera 1 is of the type adapted to receive film to be processed in the camera or during removal from the camera and includes a processing roller 20 and a mating pressure member 21 between which a film component is advanced commonly by pulling on a leader attached to the film component. As the film is advanced between the processing roller and pressure member 21, it is common to spread processing material on exposed film surfaces in a manner well known in the art. Coaxially mounted with the process roller and turning therewith is a pinion 22 which turns in a clockwise direction as film is pulled between roller 20 and member 21. A spiral shaped gear 23 is coupled to the reciprocating member 2 for movement toward engagement with the pinion 22 during picture-taking movement of the reciprocating member 2. Because reciprocating member 2 must exert substantial force on bell crank 10 to fire he flash device, it is caused to move quite rapidly under the urging of spring 3 during picture-taking operation. To prevent damage to pinion 22 by abrupt engagement with spiral shaped gear 23, the reciprocating member 2 is caused to engage the stop shoulder 18 as described above while the two gears are still separated. When the recess 19 accepts the pin 4 as the body release is raised, the reciprocating member 2 moves further to the left and pinion 22 engages spiral shaped gear 23 at a position on the spiral close to its axis of rotation 24. As the process roller 20 is turned during removal of a film component, pinion 22 turns spiral gear 23 imparting linear force to reciprocating member 2 moving it to the right as shown in FIG. 4 until arm 6 on reciprocating member 2 releases pin 4 on body release 5, allowing body release 5 to return under spring urging to a raised position with pin 4 retaining reciprocating member 2 in a cocked position shown in FIG. 1. Return of pin 16 across switch 15 does not actuate the shutter since switch 8 is in an open condition during such contact. It is important that turning of roller 20 not be resisted excessively because tearing of the leader may result. This particular linkage is advantageous for this reason since the slope of any portion of gear 23 may be adjusted to even such resistance.

Figure 6:
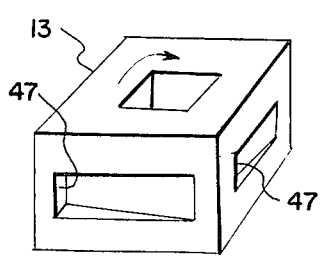
FIG. 6 is a perspective view of a flashcube socket for use in the camera shown in FIG. 1.
Figure 7:
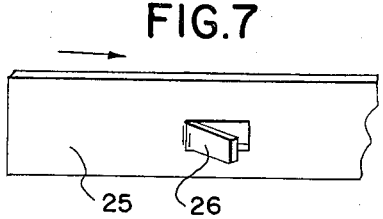
FIG. 7 is a perspective view of a portion of a flashcube indexing mechanism for use in a camera shown in FIG. 1.

Referring to FIGS. 5–7, a cube indexing mechanism is shown. A leaf spring 25 is resiliently held against a side of cube socket 13 and is coupled to the reciprocating member 2 for movement therewith. As the leaf spring is moved across the side of socket 13 a lug 26 engages a complementary recess 47 in the socket and indexes it to present a fresh bulb to the firing site. Tapering of lug 26 and recess 47 prevents reverse indexing during picture-taking movement of the reciprocating member.

Figure 8:
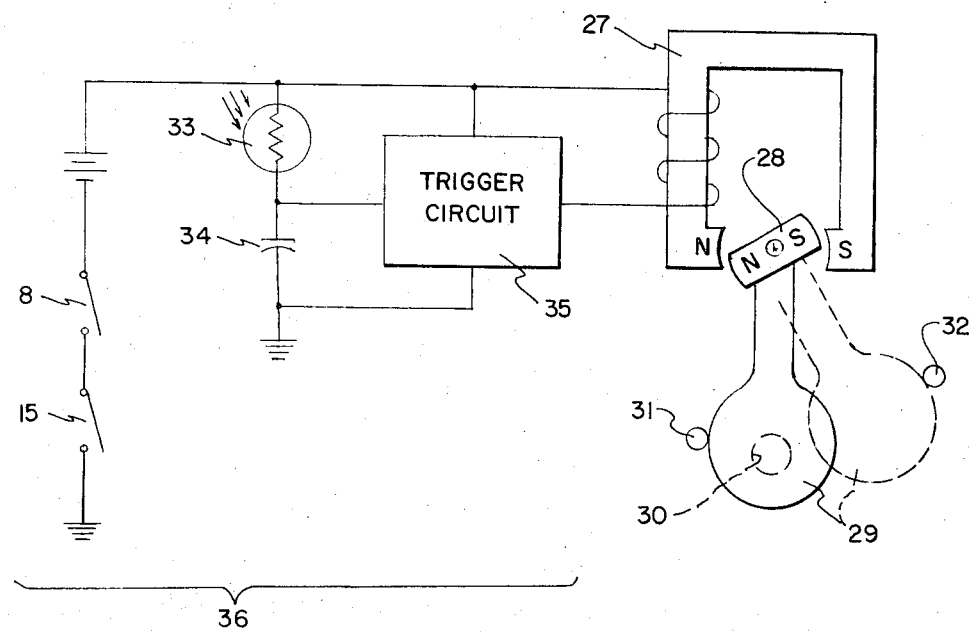
FIG. 8 is a diagram of a circuit for use with the camera shown in FIG. 1 with a schematic representation of a shutter controlled by the circuit.

Referring to FIGS. 1 and 8, operation of the shutter is accomplished by closing of switches 8 and 15 energizing an electronic shutter circuit 36 shown in FIG. 8. The circuit includes a coil for an electromagnet 27 having a permanent magnet armature 28 connected to a shutter 29 which covers the camera aperture 30. When shutter 29 is in its closed condition over aperture 30, it rests against a pin 31. Upon energization of the circuit, electromagnet 27 is energized as indicated in FIG. 8 repelling permanent magnet armature 28 causing the shutter to swing toward a pin 32. Simultaneously, current flows through a scene light responsive photoresistive element 33 to charge a capacitor 34 until sufficient voltage is reached to cause a trigger circuit 35 to de-energize the coil on electromagnet 27 thereby permitting permanent magnet armature 28 to return to its original position against pin 31. Of course, the permanent magnet armature 28 could be replaced by an ordinary armature with a spring biasing the shutter toward pin 31 to provide the return movement.

Use of this particular shutter mechanism in a camera adapted for in-camera processing has the unexpected advantage of requiring no mechanical coupling to the shutter mechanism from the flash and body release portion of the camera. This is important to this type of camera because such camera portions are commonly substantially removed from each other. It is also particularly important when a percussive flash device is used requiring mechanical actuation.

In the ordinary use of camera 1 without the flashcube in place, as shown in FIG. 3, the length of an exposure is controlled by the scene light falling on photoresistive element 33. However, when a flash device is inserted in the mechanism as shown in FIG. 1, the conductivity of the photoresistive element controls the length of exposure only if that exposure length is less than the mechanical timing provided by switch 15. This allows the use of flash in situations in which there is substantial scene light with the scene light still controlling exposure. With the same apparatus, when scene light drops to the point where the flash controls exposure, then the mechanical timing provided by switch 15 controls the length of exposure.

Although the invention as described has particular application to the shutter shown and described with regard to FIG. 8, it can also be used with a more conventional electronic shutter in which the shutter is mechanically opened, for example, by a lug, not shown, on a reciprocating member 2 and held open by the electromagnet until switch 15 is opened.

The invention has been described in detail with particular reference to preferred embodiments thereof, but it will be understood that variations and modifications can be effected within the spirit and scope of the invention.

I Claim:

1. In a camera adapted for exposing film to illumination derived from an object through an exposure aperture and for mounting a photoflash member providing illumination therefrom, the combination comprising:

primary exposure control means responsive to incident scene illumination of varying intensity for providing an actuating signal of a variable interval dependent upon the intensity of the incident scene illumination;

shutter means responsive to the actuating signal for initiating and terminating film exposure through the exposed aperture; and second exposure control means, including switch means closable for applying the actuating signal to said shutter means, responsive to a mounted photoflash unit for disconnecting the actuating signal from said shutter means after an interval sufficient to permit normal Flash exposure by the illumination derived from the photoflash member, wherein said switch means includes first and second elements, said first element being movable in response to the mounting of a photoflash member upon said camera from a first position to a second position, said first element having first and second contact surfaces, said second element being movable from a third position to a fourth position to thereby contact said first contact surface when said first element is in its first position and to contact said second contact surface when said first element is in its second position.

2. Apparatus as claimed in claim 1, wherein said first surface is so configured to contact said second element during its movement from its third position to its fourth position for an interval sufficient to permit film exposure from the illumination provided by the photoflash member.

3. Apparatus as claimed in claim 1, wherein said second contact surface of the first element is so configured so as to contact said second element when said second element is disposed in its fourth position.

4. Apparatus as claimed in claim 1, wherein said second contact element is mounted upon a drive member, said driver member having a cam surface for initiating the firing of the flashlamp member as the second contact element moves from its third to its fourth position.

* * * * *